United States Patent [19]

Decker et al.

[11] Patent Number: 4,980,897

[45] Date of Patent: Dec. 25, 1990

[54] MULTI-CHANNEL TRELLIS ENCODER/DECODER

[75] Inventors: Dwight W. Decker, Cupertino; Gary A. Anwyl, Palo Alto; Mark D. Dankberg, Encinitas; Mark J. Miller, Vista; Stephen R. Hart; Kristi A. Jaska, both of Encinitas, all of Calif.

[73] Assignee: Telebit Corporation, Sunnyvale, Calif.

[21] Appl. No.: 231,868

[22] Filed: Aug. 12, 1988

[51] Int. Cl.$^5$ ............................................. H04L 27/26
[52] U.S. Cl. ........................................ 375/38; 371/43
[58] Field of Search ................ 375/38, 39, 27; 371/43

[56] References Cited

U.S. PATENT DOCUMENTS

| | | | |
|---|---|---|---|
| 4,328,582 | 5/1982 | Battail et al. | 371/43 |
| 4,483,012 | 11/1984 | Wei | 375/27 |
| 4,520,490 | 5/1985 | Wei | 375/27 |
| 4,545,054 | 10/1985 | Davis | 371/43 |
| 4,641,327 | 2/1987 | Wei | 375/114 |
| 4,713,817 | 12/1987 | Wei | 371/43 |

OTHER PUBLICATIONS

Abstract–*A Frequency Domain Approach To Combined Spectral Shaping And Coding*, Antonio Ruiz and John M. Cioffi, ICC, Jun. 1987, pp. 1711–1715.

IEE International Conference–19.2 *KBPS Voiceband Data Modem Based on Orthongoally Multiplexed QAM Techniques*, Hirosaki, B., Yoshida, A., Tanaka, O., Hasegawa, S., Inoue, K., and Watanabe, K., IEEE Communications Society, Jun. 23–26, 1985, pp. 661–665.

Proakis; "Digital Communications"; 1983; p. 295.

G. Ungerboeck, "Channel Coding with Multilevel/- Phase Signals", Jan. 1982, *Transactions on Information Theory*, vol. IT-28, No. 1, pp. 55–67.

G. David Forney, Jr. et al, "Efficient Modulation for Band-Limited Channels", Sep. 1984, *IEEE Journal on Selected Areas in Communications*, vol. SAC-2, No. 5, pp. 632–647.

Lee-Fang Wei, "Rotationally Invariant Convolutional Channel Coding with Expanded Signal Space—Part 1: 180°", Sep. 1984, *IEEE Journal on Selected Areas in Communications*, vol. SAC-2, No. 5, pp. 659–671.

Lee-Fang Wei, "Rotationally Invariant Convolutional Channel Coding with Expanded Signal Space—Part II: Nonlinear Codes", Sep. 1984, *IEEE Journal on Selected Areas in Communications*, vol. SAC-2, No. 5, pp. 672–686.

Primary Examiner—Douglas W. Olms
Assistant Examiner—Marianne Huseman
Attorney, Agent, or Firm—Burns, Doane, Swecker & Mathis

[57] ABSTRACT

A multi-channel trellis encoder/decoder is disclosed for use with multi-channel data transmission systems. For each data transmission symbol interval, trellis encoding is applied across all available channels, and for each data reception symbol interval trellis decoding is applied across all available channels. In comparison with systems employing independent trellis encoding along each available channel, the present invention reduces data throughput delays by roughly an order of magnitude, and reduces implementation complexity by roughly a factor equal to the number of transmission channels. Further, the multi-channel trellis encoder will permit different data transmission rates as well as permitting variations in signal power and/or noise power from channel to channel.

11 Claims, 16 Drawing Sheets

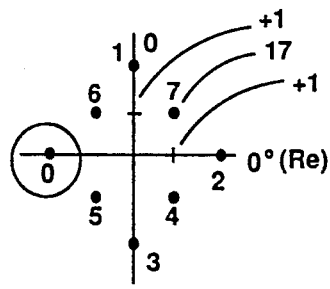
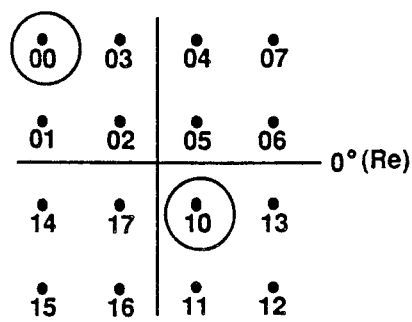
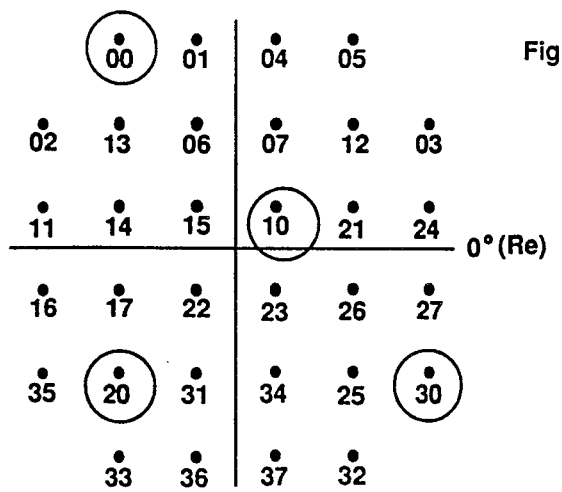
Figure 5A
Figure 5B
Figure 5C

5 Bits/Carrier

(X5-X4-X3-Z2-Z1-Z0)

90° (Im)

|  |  |  |  |  |  |  |  |
|---|---|---|---|---|---|---|---|
| (00) | 01 | 14 | 15 | (10) | 11 | 04 | 05 |
| 03 | 02 | 17 | 16 | 13 | 12 | 07 | 06 |
| 54 | 55 | (30) | 31 | 34 | 35 | (50) | 51 |
| 57 | 56 | 33 | 32 | 37 | 36 | 53 | 52 |
| (20) | 21 | 74 | 75 | (70) | 71 | 24 | 25 |
| 23 | 22 | 77 | 76 | 73 | 72 | 27 | 26 |
| 44 | 45 | (60) | 61 | 64 | 65 | (40) | 41 |
| 47 | 46 | 63 | 62 | 67 | 66 | 43 | 42 |

6 Bits/Carrier
(X6-X5-X4-X3-Z2-Z1-Z0)

90° (Im)

|  |  |  |  |  |  |  |  |  |  |
|---|---|---|---|---|---|---|---|---|---|
| (010) 011 | 134 135 | (130) 131 | 014 015 |
| 013 012 | 137 136 | 133 132 | 017 016 |
| (000) 001 | 174 175 | (030) 031 | 034 035 | (170) 171 | 004 005 |
| 003 002 | 177 176 | 033 032 | 037 036 | 173 172 | 007 006 |
| 154 155 | (020) 021 | 074 075 | (070) 071 | 024 025 | (150) 151 |
| 157 156 | 023 022 | 077 076 | 073 072 | 027 026 | 153 152 |

0° (Re)

| (120) 121 | 054 055 | (060) 061 | 064 065 | (050) 051 | 124 125 |
| 123 122 | 057 056 | 063 062 | 067 066 | 053 052 | 127 126 |
| 114 115 | (160) 161 | 044 045 | (040) 041 | 164 165 | (110) 111 |
| 117 116 | 163 162 | 047 046 | 043 042 | 167 166 | 113 112 |
| 104 105 | (140) 141 | 144 145 | (100) 101 |
| 107 106 | 143 142 | 147 146 | 103 102 |

Figure 5E

7 Bits/Carrier (X7-X6-X5-X4-X3-Z2-Z1-Z0)

90°(Im)

| 200 201 214 215 260 261 274 275 | 270 271 264 265 210 211 204 205 |
| 203 202 217 216 263 262 277 276 | 273 272 267 266 213 212 207 206 |
| 314 315 230 231 254 255 070 071 | 074 075 250 251 234 235 310 311 |
| 317 316 233 232 257 256 073 072 | 077 076 253 252 237 236 313 312 |
| 220 221 354 355 030 031 054 055 | 050 051 034 035 350 351 224 225 |
| 223 222 357 356 033 032 057 056 | 053 052 037 036 353 352 227 226 |
| 364 365 020 021 154 155 010 011 | 014 015 150 151 024 025 360 361 |
| 367 366 023 022 157 156 013 012 | 017 016 153 152 027 026 363 362 | — 0°(Re)
| 060 061 174 175 000 001 114 115 | 110 111 004 005 170 171 064 065 |
| 063 062 177 176 003 002 117 116 | 113 112 007 006 173 172 067 066 |
| 374 375 040 041 134 135 100 101 | 104 105 130 131 044 045 370 371 |
| 377 376 043 042 137 136 103 102 | 107 106 133 132 047 046 373 372 |
| 240 241 334 335 140 141 124 125 | 120 121 144 145 330 331 244 245 |
| 243 242 337 336 143 142 127 126 | 123 122 147 146 333 332 247 246 |
| 304 305 340 341 324 325 160 161 | 164 165 320 321 344 345 300 301 |
| 307 306 343 342 327 326 163 162 | 167 166 323 322 347 346 303 302 |

| State $a_2 a_1 a_0$ | Input $X_2 X_1$ | New State $a_2 a_1 a_0$ | New Output $Z_2 Z_1 Z_0$ |
|---|---|---|---|
| 0 0 0 | 0 0 | 0 0 0 | 0 0 0 |
| 0 0 0 | 0 1 | 0 1 0 | 0 1 0 |
| 0 0 0 | 1 0 | 0 0 1 | 1 0 0 |
| 0 0 0 | 1 1 | 0 1 1 | 1 1 0 |
| 0 0 1 | 0 0 | 0 0 0 | 0 1 0 |
| 0 0 1 | 0 1 | 0 1 0 | 0 0 0 |
| 0 0 1 | 1 0 | 0 0 1 | 1 1 0 |
| 0 0 1 | 1 1 | 0 1 1 | 1 0 0 |
| 0 1 0 | 0 0 | 1 0 0 | 1 0 1 |
| 0 1 0 | 0 1 | 1 1 0 | 1 1 1 |
| 0 1 0 | 1 0 | 1 0 1 | 0 0 1 |
| 0 1 0 | 1 1 | 1 1 1 | 0 1 1 |
| 0 1 1 | 0 0 | 1 0 0 | 1 1 1 |
| 0 1 1 | 0 1 | 1 1 0 | 1 0 1 |
| 0 1 1 | 1 0 | 1 0 1 | 0 1 1 |
| 0 1 1 | 1 1 | 1 1 1 | 0 0 1 |
| 1 0 0 | 0 0 | 0 0 0 | 1 1 0 |
| 1 0 0 | 0 1 | 0 1 0 | 1 0 0 |
| 1 0 0 | 1 0 | 0 0 1 | 0 1 0 |
| 1 0 0 | 1 1 | 0 1 1 | 0 0 0 |
| 1 0 1 | 0 0 | 0 0 0 | 1 0 0 |
| 1 0 1 | 0 1 | 0 1 0 | 1 1 0 |
| 1 0 1 | 1 0 | 0 0 1 | 0 0 0 |
| 1 0 1 | 1 1 | 0 1 1 | 0 1 0 |
| 1 1 0 | 0 0 | 1 0 0 | 0 1 1 |
| 1 1 0 | 0 1 | 1 1 0 | 0 0 1 |
| 1 1 0 | 1 0 | 1 0 1 | 1 1 1 |
| 1 1 0 | 1 1 | 1 1 1 | 1 0 1 |
| 1 1 1 | 0 0 | 1 0 0 | 0 0 1 |
| 1 1 1 | 0 1 | 1 1 0 | 0 1 1 |
| 1 1 1 | 1 0 | 1 0 1 | 1 0 1 |
| 1 1 1 | 1 1 | 1 1 1 | 1 1 1 |

State Diagram

MULTI-CHANNEL TRELLIS ENCODER/DECODER

BACKGROUND OF THE INVENTION

The present invention pertains to an apparatus and method for encoding data for delivery over a multi-channel data delivery system and for decoding the received encoded date after delivery. Specifically, the present invention relates to an application of trellis coded modulation (TCM) to a multi-channel communication system.

The prior art of single-channel TCM involves a data transmission technique wherein the conventionally separate processes of forward error correction (FEC) coding and modulation are combined into one process. This joining of coding and modulation mapping allows maximization of the minimum Euclidean distance between all possible coded modulated symbol sequences, resulting in significant coding gains over uncoded multilevel modulation techniques without comprise of bandwidth efficiency or reduction of the effective information rate.

J. Massey introduced a considerable performance improvement resulting from this joining of coding and modulation processes in "Coding and Modulation in Digital Communications" (Proc. 1974 Int. Zurich Seminar Digital Commun., Zurich, Switzerland, March. 1974, pp. E2(1)–E2(4)). Later, in June 1976, G. Ungerboeck and I. Csajka introduced the first TCM schemes at the International Symposium on Information Theory in Ronneby, Sweden.

It was not until the early 1980's however, that significant applications and implementations of TCM schemes began emerging. The basic principles of TCM were published by G. Ungerboeck in "Channel Coding with Multilevel/Phase Signals" (IEEE Trans. Information Theory, Vol. IT-28, January 1982, pp. 55–66). Further key research was published by G. D. Forney et al. and L. F. Wei in "IEEE Trans. Selected Areas In Comm." (vol, SAC-2, September 1984).

Several applications and uses of TCM are disclosed in U.S. Patents issued to W. Lee-Fang, including U.S. Pat. No. 4,713,817 entitled "Multidimensional, Convolutionally Coded Communication Systems", U.S. Pat. No. 4,641,327 entitled "Frame Synchronization in Trellis-Coded Communication Systems", U.S. Pat. No. 4,520,490 entitled "Differentially Nonlinear Convolutional Channel Coding with Expanded Set of Signalling Alphabets", and U.S. Pat. No. 4,483,012 entitled "Differentially Convolutional Channel Coding with Expanded Set of Signalling Alphabets".

The prior art of single-channel TCM involves the use of combined forward error correction/modulation in a transmitter and corresponding demodulation/decoding in a receiver to reduce the number of data errors at the receiver. In general, TCM schemes employ an encoder to generate, based on the input data, a coded modulated symbol sequence from an expanded signal set. In the receiver, some of the received data errors are corrected by a decoder. The decoder selects the sequence most likely to have been transmitted by selecting the allowed sequence that most resembles (in term of squared Euclidean distance) the actual received, noisy sequence. The term "trellis" in trellis coded modulation was introduced because the allowed sequences in a particular TCM scheme can be described by a state transition (trellis) diagram similar to the trellis diagrams of prior art binary convolutional codes.

Use of trellis coded modulation over a given channel allows an increase in data throughput rate without degradation of the received data error rate, with respect to uncoded transmission. TCM can also be used to achieve improved performance at the same data throughput rate, with respect to uncoded transmission. In 1984, a TCM scheme was adopted by the International Telegraph and Telephone Consultative Committee (CCITT) for use in high-speed voiceband modems ("Recommendation V.32 for a family of 2-wire, duplex modems operating on the general switched telephone network and on leased telephone-type circuits," document AP VIII-43-E, May 1984). The resulting coding gains allow reliable transmission of data at higher rates over voiceband channels than were previously achieved with uncoded transmission. Single-channel TCM techniques are currently also being applied to other bandwidth-constrained channels, such a satellite, terrestrial microwave, and mobile communications.

In the prior art, when TCM is utilized for more than one channel of a multi-channel system, a separate encoder and decoder is allocated to each available channel, and the coding is independently applied along each channel. This technique is implementationally complex, since it requires N encoders and N decoders for an N-channel system. Equivalently, in the prior art, a single encoder and decoder hardware set could be multiplexed, where the set is used to encode and decode the data for each channel, and the encoder and decoder states for each channel are saved while the hardware is used to process the date for the other channels. This prior art application of TCM to an N-channel system is functionally equivalent to use of N encoders and N decoders, and is implemenationally complex because of the large quantities of state information that must be saved. The multi-channel trellis encoder/decoder of the present invention introduces an apparatus and method for application of TCM across channels in a multi-channel environment, resulting in reduced implementation complexity and also reduced data throughput delay with respect to the prior art, while retaining the ability to handle variations from channel to channel in data transmission rates, signal power, and noise power.

SUMMARY OF THE INVENTION

In accordance with the illustrated embodiments, the present invention provides a method and apparatus for encoding data for delivery over a multi-channel data delivery system and for decoding the received encoded data after delivery. This is accomplished by sequentially trellis encoding portions of the data for delivery across each channel of the multi-channel data delivery system. The encoded data is then simultaneously applied to each of the channels of the multi-channel data delivery system. Upon receipt, the received encoded data is sequentially decoded from the signal received from each channel of the multi-channel data delivery system.

The present invention also includes encoding means wherein the data for delivery over a multi-channel data delivery system is sequentially trellis encoded as portions of the data for delivery across each channel of the multi-channel data delivery system. The encoded data is then simultaneously presented to each of the channels of the multi-channel data delivery system for transmission.

Similarly, the present invention includddecoding means wherein the received encoded data is sequentially decoded from the signal received from each channel of the multi-channel data delivery system.

BRIEF DESCRIPTION OF THE DRAWINGS

FIGS. 5A,5B,5C,5D,5E,5F illustrate specific embodiments of signal mappings for $2^{m+1}$ point constellations for m=2,3,4,5,6,7 respectively.

FIG. 7 presents the truth table for the rate ⅔, constraint length 3 convolutional encoder shown in FIG. 6.

DETAILED DESCRIPTION OF THE PREFERRED EMBODIMENTS

Figure 1:
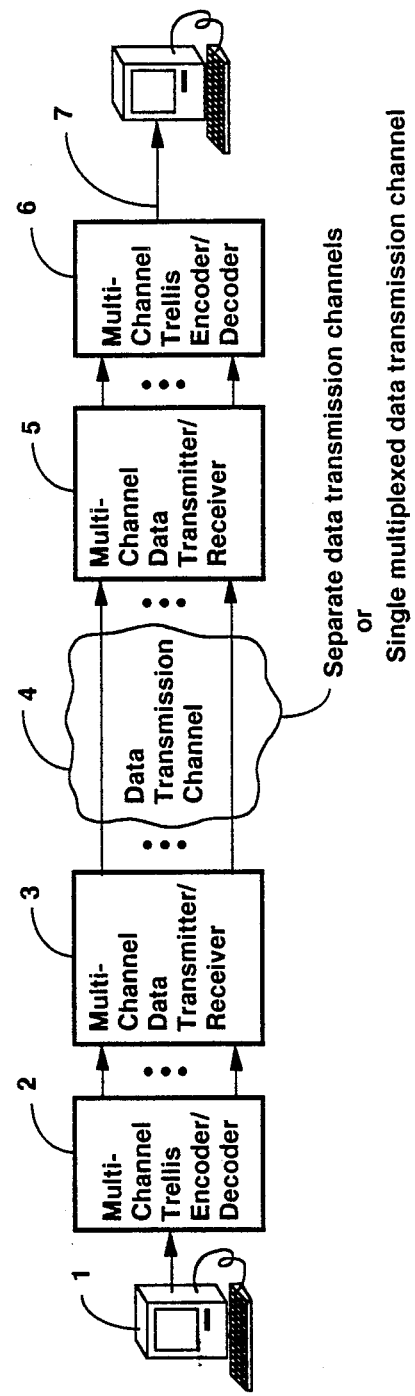
FIG. 1 shows a generalized block diagram of a system in which the present invention may be employed.

FIG. 1 shows a generalized block diagram of a system in which the present invention may be employed. Referring to FIG. 1, digital bits are received from an external device (for example a computer) 1 by the multi-channel trellis encoder/decoder 2 of the present invention. The bits may be input from multiple sources, as opposed to a single source 1 as illustrated in FIG. 1. The bits are multi-channel trellis encoded by 2, and the vectors which result from the encoding process are passed to a multi-channel data transmitter/receiver 3. The transmitter/receiver 3 transmits the information across a data transmission channel 4 to another multi-channel data transmitter/receiver 5. The transmitter/receiver 5 passes receive vectors, which ideally are similar to the ones transmitted, to a multi-channel trellis encoder/decoder 6. The similarity of the vectors received by 6 to the vectors transmitted by 2 depends on characteristics of the data transmission channel 4 and the multi-channel data transmitter/receivers 3 and 5. The multi-channel trellis encoder/decoder 6 decodes the vectors, and produces at its output port 7 digital bits, which are ideally a reproduction of the bits which were received by 2 from 1.

Figure 2:
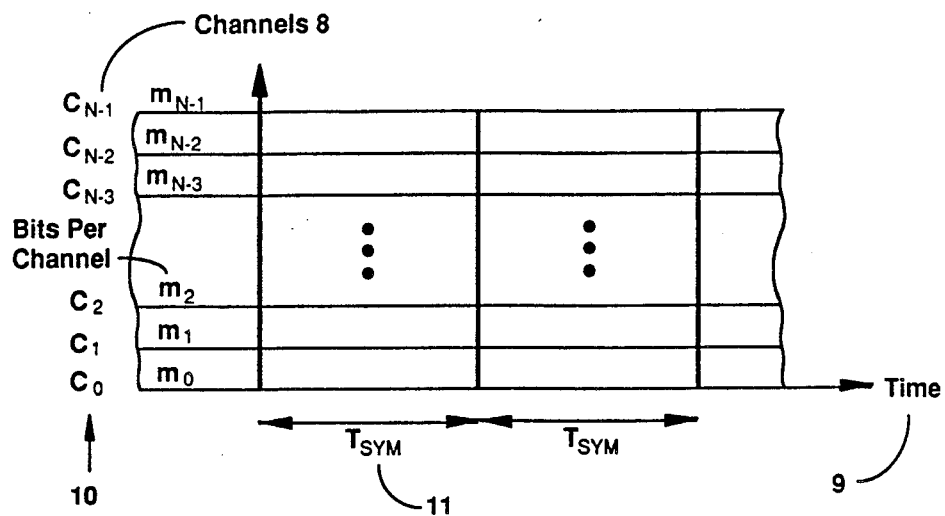
FIG. 2 illustrates how transmission over the data transmission channel can be partitioned by channel and by time.

FIG. 2 illustrates an example of how transmission over the data transmission channel 4 of FIG. 1 can be partitioned by channels 8 and by time 9. In FIG. 2, transmission occurs over N channels, where each channel is designated $c_n$ ($0 \leq n \leq N-1$) 10. On each channel, symbols of duration $T_{SYM}$ 11 are transmitted. For simplicity, FIG. 2 indicates equal symbol durations, however, as later described, the present invention does not require that symbol durations on the various channels be related to each other. FIG. 2 also indicates that channel $c_n$ is assumed to be capable of transmitting $m_n$ bits per symbol, and indicates that, as later described, the invention does not require $m_n$ to be the same for each channel.

Depending on the data transmission channel connectivity, the data flow described above could occur in a loopback, i.e. data could flow from 3 across 4 and back to 3 and then 2 and then 1. Also, the present invention may be employed with data transmission in one direction (half duplex) or with data transmission in two directions (full duplex).

In the interest of clarity, and in order to describe the present invention in more detail, a particular embodiment of the system presented in FIG. 1 will hereafter be assumed. This embodiment will be such that the multi-channel data transmitter/receiver 3 and 5 of FIG. 1 is a multi-carrier modulator/demodulator (modem), and the data transmission channel 4 of FIG. 1 is a single analog transmission channel. This analog channel may be a wireline channel (for example, a telephone line) or a wireless channel (for example a line of sight or satellite link).

In the next paragraphs, trellis encoding, as opposed to decoding, is first discussed in detail with respect to the selected multi-carrier embodiment, and the difference between the prior art and the present invention is described. This is followed by a discussion of trellis decoding in general as well as the present multi-channel decoding invention. Next, a detailed block diagram of the selected multi-carrier embodiment is presented. Finally, flowcharts of the invention along with a hardware implementation are discussed.

Figure 8:
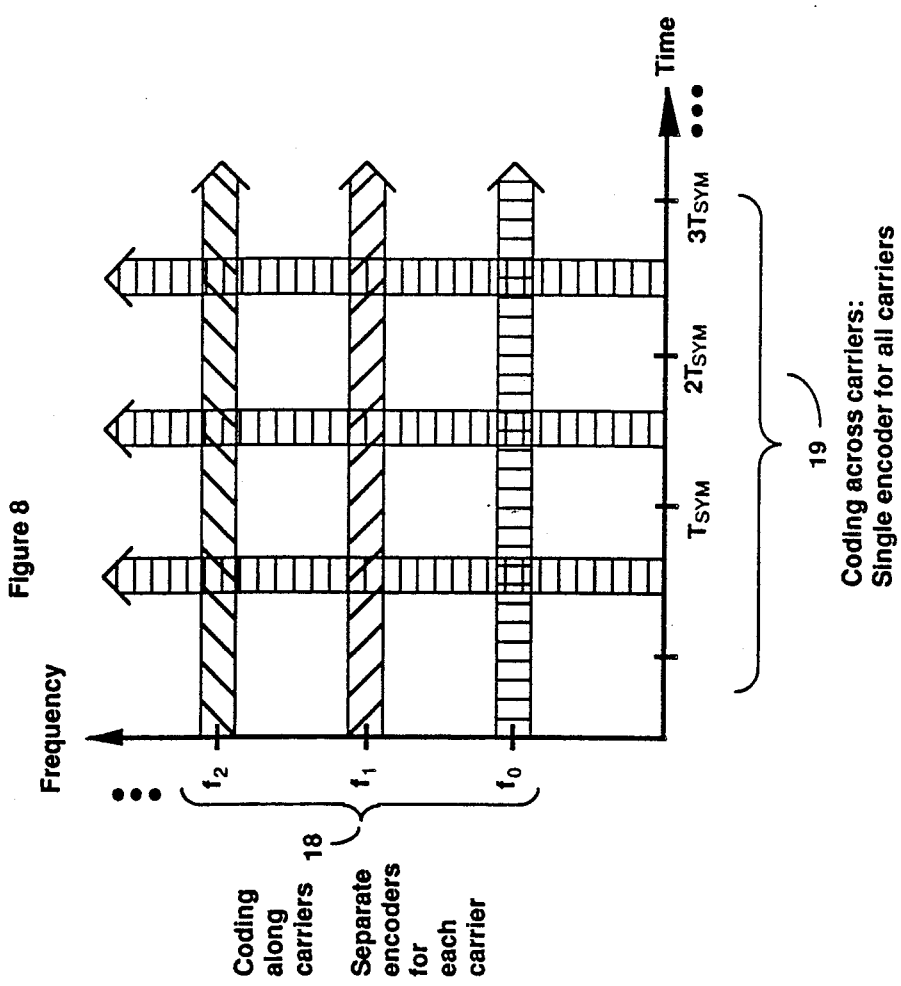
FIG. 8 illustrates the difference between single-channel and multi-channel trellis encoding for the case in which the data transmission channel is a multiple carrier channel.

In the case in which the multi-channel transmitter/receiver is a multi-carrier modem, transmission over the channels of FIG. 2 becomes modulation of carrier frequencies $f_n$ as indicated in FIG. 8. That is, for each carrier $f_n$, each symbol of duration $T_{SYM}$ consists of modulation, by the multi-carrier modem, of $m_n$ digital bits of information from the stream of bits received by the multi-channel trellis encoder/decoder 2 of FIG. 1. In this process the multi-channel trellis encoder maps sets of $m_n$ digital bits into vectors, which can be represented by points in an X-Y coordinate system. Each vector is then used to modulate the carrier just as in conventional quadrature amplitude modulation (QAM), where the transmitted signal consists of phase independent sine and cosine signals at the carrier frequency. The amplitude of the sine signal is given by the Y coordinate of the vector, and the amplitude of the cosine signal is given by the X coordinate of the vector.

Prior art trellis encoding may be referred to as single-channel trellis encoding, since all the bits input to the encoder are used in the modulation of a single carrier. In order to understand multi-channel trellis encoding, a brief review of both QAM and single-channel trellis encoding follows. A more detailed description of single-channel trellis encoding/decoding may be found in "Trellis-Coded Modulation with Redundant Signal Sets", Ungerboeck, G. IEEE Communications Magazine, Vol. 25, No. 10, issued Feburary 1987, pp. 5-21., and also in "Channel Coding with Multilevel/Phase Signals", Ungerboeck, G., IEEE Transactions on Information Theory", Vol. IT-28, No. 1, January 1982, pp. 55-66.

Figure 3:
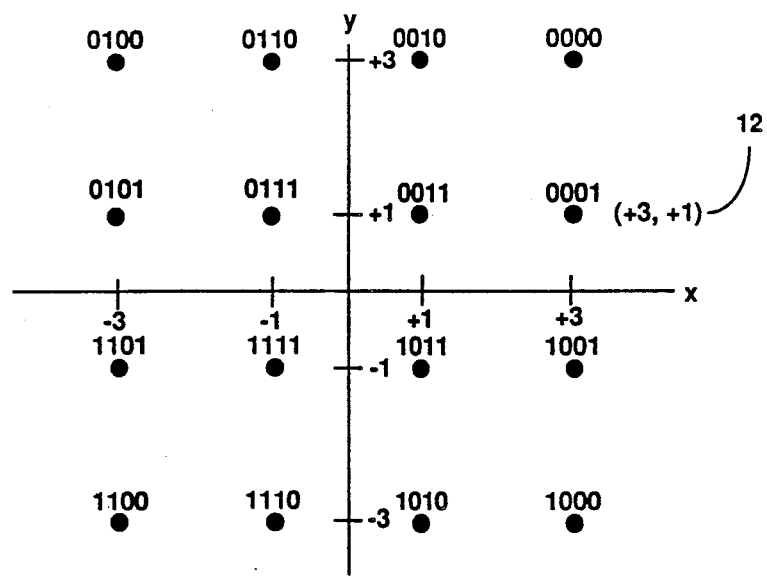
FIG. 3 illustrates a sixteen point constellation for quadrature amplitude modulation (QAM).

Trellis coded modulation differs from conventional QAM (see FIG. 3) in the way that digital bits are mapped into an X-Y coordinate system. In QAM, a digital bit stream to be transmitted is partitioned into m-bit words. There exists a one-to-one mapping between each m-bit word from the digital bit stream and one of $2^m$ points in the X-Y plane. The modulator has no memory, so that the m bits modulated during the current symbol period are not affected by the bits which are modulated in previous symbol periods. FIG. 3 illustrates a QAM constellation of 16 points in the X-Y plane. In this illustration, m=4, and any set of 4 binary bits are mapped to one of the $2^4=16$ points. For example, the bit sequence 0001 maps to the point (X=+3, Y=+1) 12.

While uncoded amplitude and/or phase modulation systems (e.g. QAM) employ a $2^m$ point constellation to transmit m bits per symbol, trellis encoding employs a redundant constellation which consists of more than $2^m$ points to transmit m bits per symbol. In general, a trellis encoder consists of a rate m/p finite-state encoder along with a mapping of the p encoder output bits to one of $2^p$ points in a constellation. The finite-state encoder generates a coded modulation sequence by governing the selection of constellation points.

The channel capacity of additive Gaussian noise channels for the case of discrete amplitude/phase modulation at the channel input and unquantized signal observation at the channel output has been computed by Ungerboeck (refer to "Trellis-Coded Modulation with Redundant Signal Sets" pg. 7). The calculations show that most of the achievable coding gain can be obtained by expanding the constellation used for uncoded modulation (e.g. QAM) by a factor of two. Therefore, most trellis coded modulation schemes employ a constellation of size $2^{m+1}$ for transmission of m bits per symbol. An embodiment of an encoder for such a trellis coded modulation scheme is shown in FIG. 4.

According to FIG. 4, trellis encoding is performed as follows. The trellis encoder 70 consists of a finite-state encoder 71 and a signal mapping look-up table 72. The input to the trellis encoder 70, which is also the input to the finite-state encoder 71, consists of m binary bits on lines 73. These bits may be designated $x_m, \ldots, x_{k+1}, x_k, \ldots, x_2, x_1, x_m$ being the most significant bit (MSB) 74. The finite-state encoder expands the m input bits 73 into m+1 coded bits 75 using a rate $k/k+1 (k \leq m)$ binary convolutional encoder 76 to encode the k least significant input bits 77. The m+1 bit output 75 of the finite state encoder 71, which may be designated $x_m, \ldots, x_{k+1}, z_k, \ldots, z_2, z_1, z_0$ 78, is applied to the signal mapping look-up table 72 to pick a point (X,Y) 79 in a $2^{m+1}$ point constellation. Subsets 80 are discussed in the description of the multi-channel trellis decoder.

FIGS. 5A-5F illustrate specific examples of $2^{m+1}$ point constellations for values of m=2-7 respectively. Each of the points in the constellations are labeled with octal notation. As an example, the constellation pictured in FIG. 5A is used when m=2 information bits per symbol are to be transmitted. The constellation consists of $2^{m+1}=8$ points. If the m+1=3 bit output of the finite state encoder 71 of FIG. 4 is 1 1 1, then this output is mapped by the signal mapping look-up table 72 of FIG. 4 to point 17 in FIG. 5A, which is labeled as octal numeral 7, and has coordinates X=+1, Y=+1. The constellations depicted in FIGS. 5B, 5C, 5D, 5E, 5F are used when m=3, 4, 5, 6, 7 respectively. From these examples, and from "Trellis-Coded Modulation with Redundant Signal Sets" by Ungerboeck, one skilled in the art can generate other constellations for m=2-7, and also constellations for other values of m.

Figure 4:
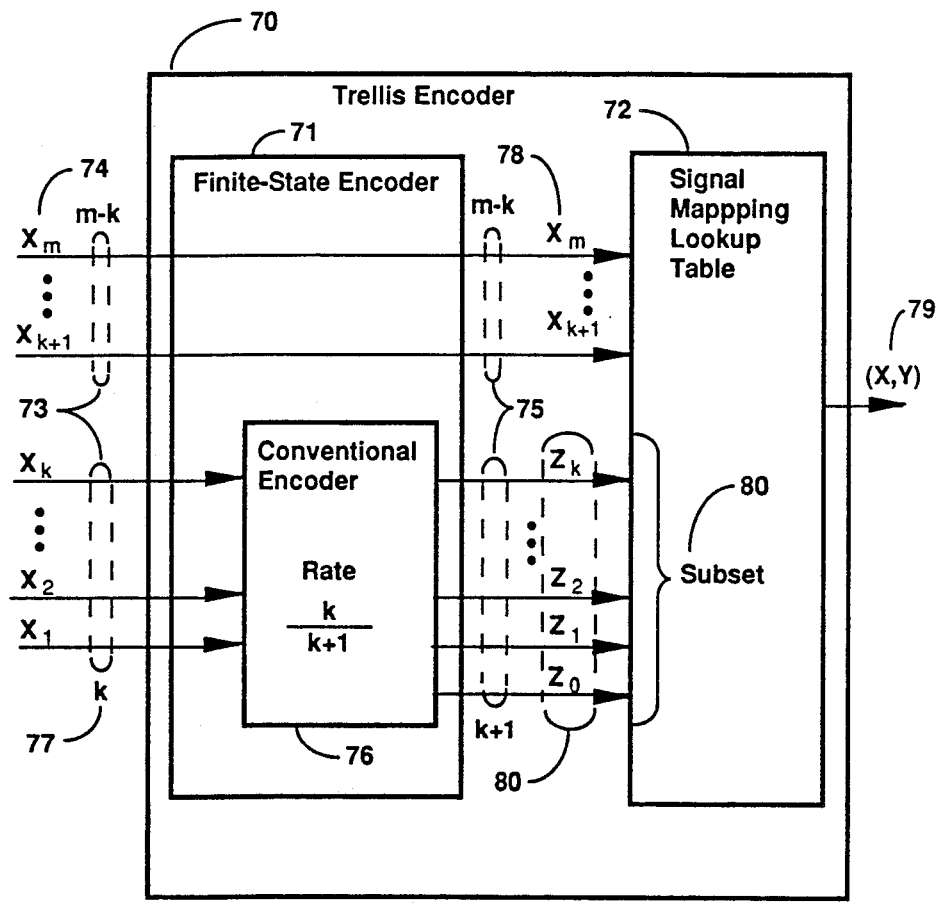
FIG. 4 shows a block diagram of a trellis encoder which maps an m-bit input into one of $2^{m+1}$ constellation points.
Figure 6:
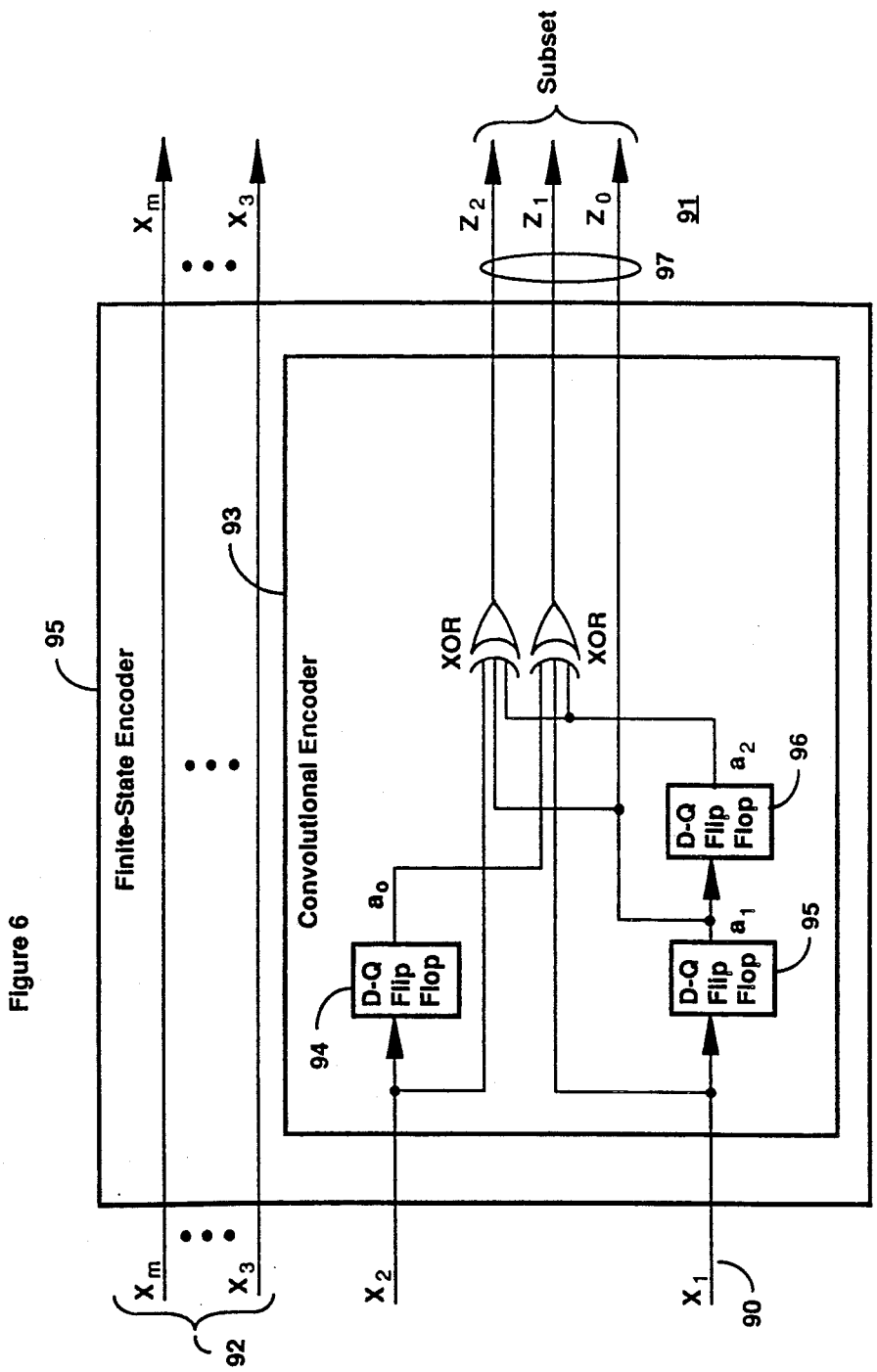
FIG. 6 illustrates a specific embodiment of a finite state encoder which contains a rate ⅔, constraint length 3 convolutional encoder.

FIG. 6 illustrates a specific embodiment of the finite state encoder 71 of FIG. 4. Referring to FIG. 6, the m binary input bits are denoted by $x_m, \ldots, x_3, x_2, x_1$ 90, where $x_m$ is defined as the most significant bit (MSB). The encoder transforms the m input bits into (m+1) bits, which are denoted by $x_m, \ldots, x_3, z_2, z_1, z_0$ 91. The m−2 most significant input bits 92 are not operated on by the convolutional encoder 93. The convolutional encoder 93 is a rate ⅔, constraint length 3 convolutional encoder. The present output bit set of the convolutional encoder, and also the finite-state encoder, depends on the present input bit set $x_2, x_1$ and also the previous two sets of input bits $x_2, x_1$. In this particular embodiment, if any bits are to be modulated (i.e. if m≠0), then the minimum value that m may assume is 2. Bits $x_m \ldots x_3$ may be omitted, but bits $x_2$ and $x_1$ must be input in order for the convolutional encoder to operate properly.

FIG. 7 presents the truth table of the rate ⅔, constraint length 3 convolutional encoder 93 shown in FIG. 6. States $a_2, a_1$, and $a_0$ of this table refer to the state of the signal on the Q terminal of the D flip-flops 194, 195, and 196 respectively. Using this table, it can be seen that the convolutional encoder can be implemented by means of a look-up table and associated software or firmware.

The prior art of single-channel trellis encoding differs from the present multi-channel trellis encoding invention in the way that the trellis encoder (finite state encoder along with signal mapping look-up table) is used, and not in the encoder structure. The difference in use is that encoding is performed across multiple channels, as described in the following paragraphs, rather than along each individual channel.

Referring to the presently assumed embodiment, in which the multi-channel data transmitter/receiver is a multi-carrier modem and the data transmission channel of FIG. 1 is an analog transmission channel, FIG. 8 illustrates the partitioning of this channel in time and frequency and illustrates the difference between single-channel and multi-channel trellis encoding. Single-channel trellis encoding would require N encoders and N decoders to perform trellis coded modulation on the N carrier channel. Each encoder/decoder set would be used for one carrier only. This is depicted by the horizontal lines of 18. The trellis encoding of a particular carrier by the single-channel encoder is performed completely independently of the trellis encoding of the other carriers. If a finite state encoder of the type of FIG. 6 is used, then the modulation of one set of m bits on a given carrier depends on the values of the last two sets of m input bits which were transmitted on that particular carrier. In general, the encoder structure determines how many sets of previous input bit sets affect the current output bit set. In FIG. 6, the current bit set and the two previous bit sets are inputs to the exclusive-OR gates, and so the current bits set and the two previous bit sets determine the output bit set.

On the other hand, multi-channel trellis encoding requires only one encoder and one decoder to perform trellis encoding and decoding on an N carrier channel. This is depicted by the vertical lines 19 in FIG. 8. In a given symbol period, the bits to be transmitted on carrier $f_0$ are input to the encoder, followed by the bits to be transmitted on carrier $f_1$, and so on, until all of the bits have been encoded for each carrier in turn. Then the bits to be transmitted during the next symbol period on carrier $f_0$, $f_1$, $f_2$, etc. are encoded in turn. In this way, the present invention provides the benefits of trellis coded modulation on multiple carriers with roughly the same implementation complexity of a single carrier system. If N encoders and N decoders were used to provide trellis coding on multiple channels, as in prior art, the implementation complexity would be increased by a factor roughly equal to the number of channels. The number of input bits per symbol on each carrier $(m_n)$ is not constrained by the present invention to be the same for each carrier. Note that the multi-channel encoding process introduces a coupling between the modulation on groups of carriers. For example, if the finite state encoder 95 of FIG. 6 is used, the symbol which modulates carrier $f_n$ is determined by the bits to be transmitted on carrier $f_n$ together with the bits which were transmitted on carriers $f_{n-1}$ and $f_{n-2}$.

The sequence of demodulated outputs which are received as inputs by a single-channel decoder may differ from the sequence which is received by the multi-channel decoder in the following way. The single-channel decoder receives sequential demodulated outputs from a single carrier, so that the noise power as seen by the decoder is constant. This is not necessarily true when each demodulated output used to form the decoder input sequence is received from a different carrier. The present invention employs a multi-channel decoder which can perform maximum likelihood decoding when the noise power as seen by the decoder is not constant.

When a multi-channel trellis encoder/decoder and a single-channel trellis encoder/decoder which operate on symbols of equal duration are compared, the delay introduced by the multi-channel decoder is roughly an order of magnitude less than the delay introduced by the single-channel decoder. A single-channel decoder, which decodes a single-carrier sequence encoded by 95 of FIG. 6, typically introduces a delay of twelve to fifteen symbols periods. On the other hand, the multi-channel decoder introduces a delay of less than a symbol period.

The difference in delay can be understood in the following way. Convolutional encoding introduces interdependence of transmitted bits. This means that, after receiving a particular receive vector, both the single-channel and the multi-channel decoder must observe several subsequent receive vectors (12-15 assuming the encoder of FIG. 6) before a decision on the particular receive vector is made. Recall that the single-channel encoder introduces transmit vector interdependence along time, which the multi-channel encoder introduces interdependence across carriers. The single-channel decoder receives a new receive vector in each symbol period, while the multi-channel decoder receives a new receive vector from each carrier, in the same symbol period. Hence the multi-channel decoder decodes an entire set of N vectors in one symbol period, and thus it introduces a delay of less than one symbol period.

The present invention employs code tailing in order to enable the multi-channel decoder to completely decode transmissions from all N carriers which occur in the current symbol period, before starting to decode transmissions which occur in the next symbol period. If the number of carriers is 512, a decision on the vector from the 1$^{st}$ carrier can be made after transmissions from the subsequent 12 to 15 carriers are observed (i.e. input into the decoder). If code tailing were not used, a decision on the receive vector from the 512$^{th}$ carrier could not be made until transmissions which occur on the first several carriers during the next symbol period were observed. Coding tailing is implemented in the following way. Before a block of bits (e.g. the bits which are to be transmitted on the 512 carriers) is encoded, the encoder is put in a known state (conventionally 0). Code tail bits are appended to the end of the block of the data which cause the encoder to return to the known state. The number of code tail bits which must be added depends on the amount of memory (i.e. the number of flip-flops in FIG. 6) in the encoder. In the embodiment of the encoder of FIG. 6 and FIG. 7, $x_2 x_1 = 00$ must be input twice in order to put the encoder into a new state of 0 (independent of the present state). Therefore, in an embodiment of the present invention, the two least significant bits transmitted on channels $f_{N-2}$ and $f_{N-1}$ are 00. In other embodiments of the invention, it is not necessary that code tailing be used.

BLOCK DIAGRAM

Figure 9:
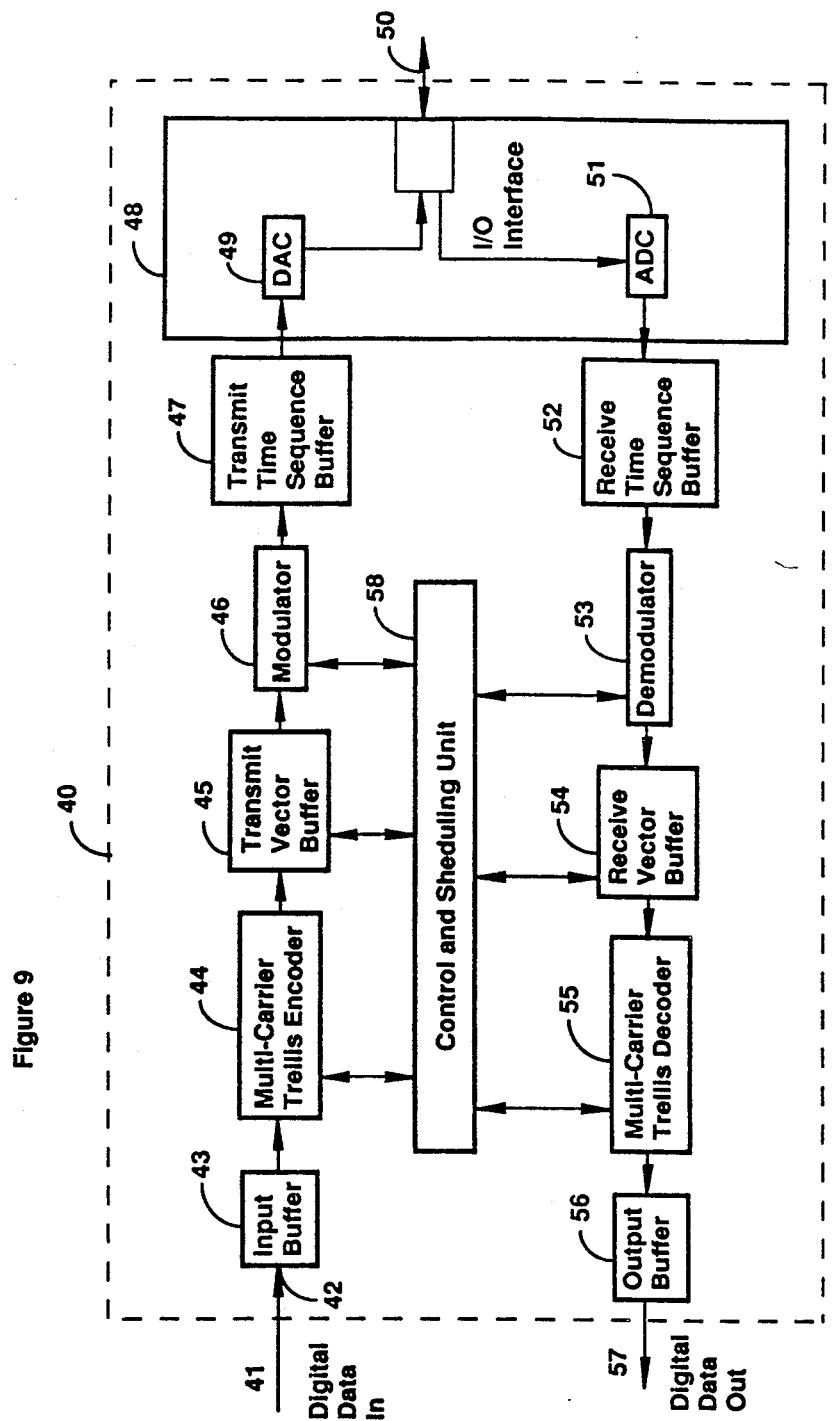
FIG. 9 is a block diagram of an embodiment of the present invention.

FIG. 9 shows a block diagram of an embodiment of the present invention in which the multi-channel data transmitter/receivers 3 and 5 of FIG. 1 are multi-carrier modems and the data transmission channel 4 of FIG. 1 is a single analog transmission channel. This embodiment is similar to the specific embodiment described in U.S. Pat. No. 4,679,227 by Hughes-Hartogs. The following is a description of both the interconnections and the functional flow of the block diagram in FIG. 9.

In the embodiment shown in FIG. 9, the multi-channel trellis encoder and decoder are contained within the modem 40. An incoming data stream is received, from an external device on line 41, by the modem 40 at the data input port 42. The data is stored as a sequence of data bits in the input buffer memory 43.

The output of the buffer memory 43 is coupled to the input of the multi-channel trellis encoder 44. The multi-channel trellis encoder 44 utilizes the multi-channel trellis encoding scheme described below to encode a given number of bits into an $(X_n, Y_n)$ vector for each carrier frequency $f_n$. For example, if it were determined that four bits $(m_n = 4)$ were to be transmitted on carrier frequency $f_n$ then four bits from the input buffer 43 would be converted to one of the $2^{m+1} = 32$ points in a 4 bit/carrier constellation FIG. 5C.

The output data set of the multi-channel trellis encoder 44 is coupled to a transmit vector buffer memory 45 where the $(X_n, Y_n)$ vectors are stored.

The transmit vector buffer memory 45 is also coupled to the input port of a modulator 46. The modulator 46 reads one entire set of $(X_n, Y_n)$ vectors for $n = 0 \ldots N-1$ (where N is the number of carriers) from the transmit vector buffer memory 45 and then modulates the amplitudes of the sine and cosine components for each carrier frequency $f_n$, using the corresponding vector $(X_n, Y_n)$. To do this, the modulator could perform an inverse fast Fourier transform (IFFT) to generate a digitally encoded time sequence representing a waveform comprising the ensemble of all N carrier frequencies.

The output port of the modulator 46 is coupled to a transmit time sequence buffer 47. The digital sequences which the modulator 46 computes are stored in this buffer 47.

The transmit time sequence buffer 47 is also coupled to the input port of a digital-to-analog converter (DAC) 49 included in an analog I/O interface 48. The analog I/O interface 48 couples the output signal of the DAC 49, which is also the output signal from the modem, to a multi-carrier analog channel 50. Alternately, the analog I/O interface 48 could couple the output of the modem to a frequency upconverter, if the analog channel requires transmission at higher frequencies than are output by the I/O interface 48.

A signal received from the multi-carrier analog channel 50 (or alternately from a frequency downconverter) is applied to a analog-to-digital converter (ADC) 51 in the analog I/O interface 48.

The output signal from the ADC 51 is coupled to a receive time sequence buffer 52. The ADC 51 converts the analog waveform to a digital time series which is stored in the receive time sequence buffer 52.

The output port of the receive time sequence buffer 52 is coupled, in turn, to the input port of a demodulator 53. The demodulator 53 reads each digital time sequence from the receive time sequence buffer 52 and converts it into N $(\tilde{X}_n, \tilde{Y}_n)$ vectors, where N is the number of analog channel carriers 50. This conversion may be accomplished by performing a fast Fourier transform (FFT) on the time series. The notation $(\tilde{X},\tilde{Y})$ is used instead of (X,Y), since a vector received from a noisy channel is usually not exactly the same vector that was transmitted.

The output signal of the demodulator 53 is coupled to a receive vector buffer memory 54 where the $(\tilde{X}_n, \tilde{Y}_n)$ vectors are temporarily stored.

The output port of the receive vector buffer memory 54 is then coupled to the input port of a multi-channel trellis decoder 55. The multi-channel trellis decoder 55 utilizes the multi-channel trellis decoding scheme described below to decode each set of the $(\tilde{X}_n, \tilde{Y}_n)$ vectors $(n=0 \ldots N-1)$, resulting in a set of output data bits at its output port.

The multi-channel trellis decoder 55 has an output port coupled to a output buffer memory 56, into which it stores the set of output data bits. The output buffer memory 56 is, in turn, coupled to an external device 57, which receives the data bits from the output buffer memory 56.

A control and scheduling unit 58 is coupled to the multi-channel trellis encoder 44, the transmit vector buffer 45, the modulator 46, the demodulator 53, the receive vector buffer 54, and the multi-channel trellis decoder 55. The control and scheduling unit 58 maintains overall supervision of the sequence of operations. It also provides operational information to each of the blocks to which it interfaces. Specifically, it provides the multi-channel trellis encoder 44 and the multi-channel trellis decoder 55 with the number of carriers (N), the number of input bits per symbol which are to be transmitted on each carrier ($m_n$ for $n=0 \ldots N-1$), and the noise power for each carrier. These parameters may be determined in many ways, including user specification as well as computational algorithms which may be implemented within the modem.

MULTI-CHANNEL TRELLIS ENCODER

For the sake of clarity and ease of description, the operation of the multi-channel trellis encoder (44 of FIG. 9) is described as it is used in a system with N carriers, where $m_n$ digital information bits are modulated on carrier $f_n$ ($0 \leq n \leq N-1$). Furthermore, the following description assumes an encoder as described in FIGS. 5A-5F, FIG. 6, and FIG. 7 is employed. One skilled in the art can easily adapt the following scheme to handle an encoder with different parameters.

Referring to FIG. 9, the multi-channel trellis encoder 44 transforms bits from the input buffer 43 into (X,Y) vectors, and places the (X,Y) vectors into the transmit vector buffer 45.

Figure 10:
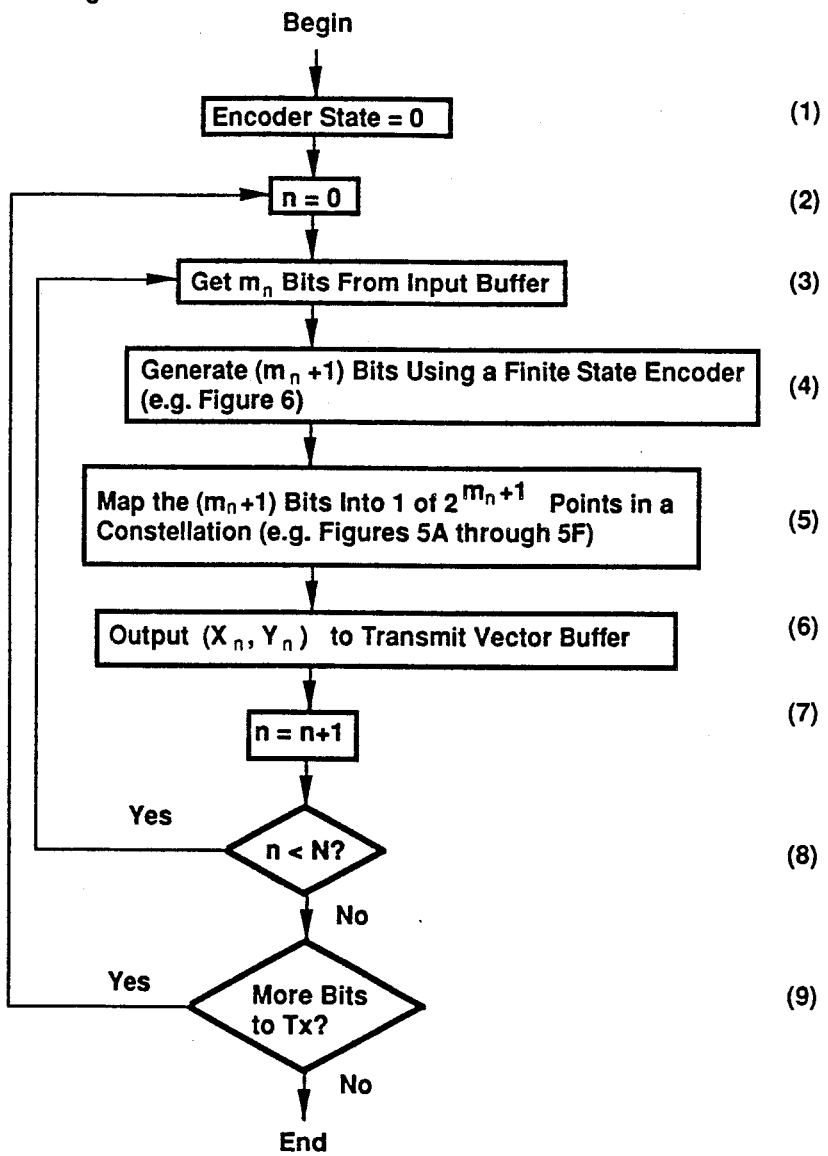
FIG. 10 is a flow chart illustrating the multi-channel trellis encoding process of the present invention.

In a preferred embodiment, the multi-channel trellis encoder operates as illustrated in FIG. 10.

In step 1, the encoder state in initialized to 0. This means that the flip-flops in FIG. 6 are cleared. Equivalently, this means that the current state ($a_2a_1a_0$) in FIG. 7 is 000.

Next, as depicted in FIG. 10 step 2, n is set to 0, so that the symbol used to modulate carrier $f_0$ is the first symbol to be generated.

In step 3, $m_n$ bits are read from the input buffer (43 of FIG. 9).

In step 4, the $m_n$ bits are encoded using the finite state encoder of FIG. 6, and using the table of FIG. 7 to implement the convolutional encoder 93 of FIG. 6.

In step 5, a look-up table is used to map the $m_n+1$ bits from the output of the finite state encoder to the corresponding point in a $m_n$ bits/carrier constellation, wherein sample constellations for $m=2$ through 7 are shown in FIGS. 5A-5F.

In step 6, the coordinates of the constellation point are transferred to the transmit vector buffer (45 of FIG. 9).

As seen by following steps 7 and 8, the above process is repeated until data is modulated onto each of the N carriers. In step 9, if more bits are to be transmitted, the process begins again with $n=0$, but without initialization of the encoder, at step 2.

An embodiment of the present invention employs code tailing (described above) to allow the multi-channel trellis decoder to make symbol decisions for an entire set of carriers in one symbol time, before starting to decode information from the next set of carriers. Therefore, in addition to the steps described in the flowchart of FIG. 10, the two least significant bits to be transmitted on channels $f_{N-1}$ and $f_{N-2}$ must be 00.

MULTI-CHANNEL TRELLIS DECODER

For the sake of clarity and ease of description, the operation of the multi-channel trellis decoder (55 of FIG. 9) is described as it is used in a system with N carriers, where $m_n$ digital information bits are modulated on carrier $f_n$ ($0 \leq n \leq N-1$). Furthermore, the operation of the multi-channel trellis decoder is described assuming that the received demodulated vectors were multi-channel trellis encoded using the multi-channel trellis encoder described above. One skilled in the art can easily adapt the multi-channel trellis decoding scheme to handle an encoder with different parameters.

Figure 14:
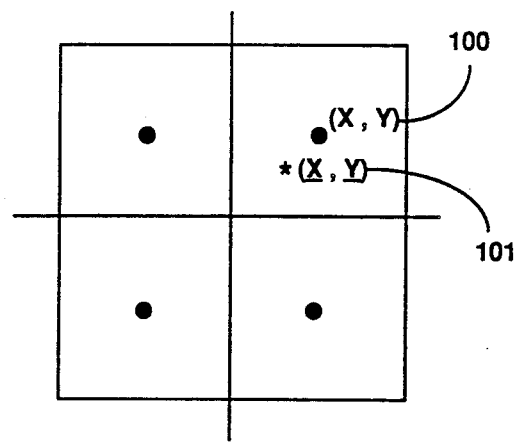
FIG. 14 illustrates a transmitted vector, and the same vector after it is received from a noisy channel.

Referring to FIG. 9, the multi-channel trellis decoder 55 transforms $(\tilde{X},\tilde{Y})$ vectors from the receive vector buffer 54 into digital information bits, which it places into the output buffer 56. The notation $(\tilde{X},\tilde{Y})$ is used instead of (X,Y), since a vector received from a noisy channel is usually not exactly the same vector that was transmitted. For example, referring to the four point constellation of FIG. 14, if (X,Y) 100 was transmitted across a noisy channel, then (X,Y) 101 is an example of a demodulated vector.

Figure 11:
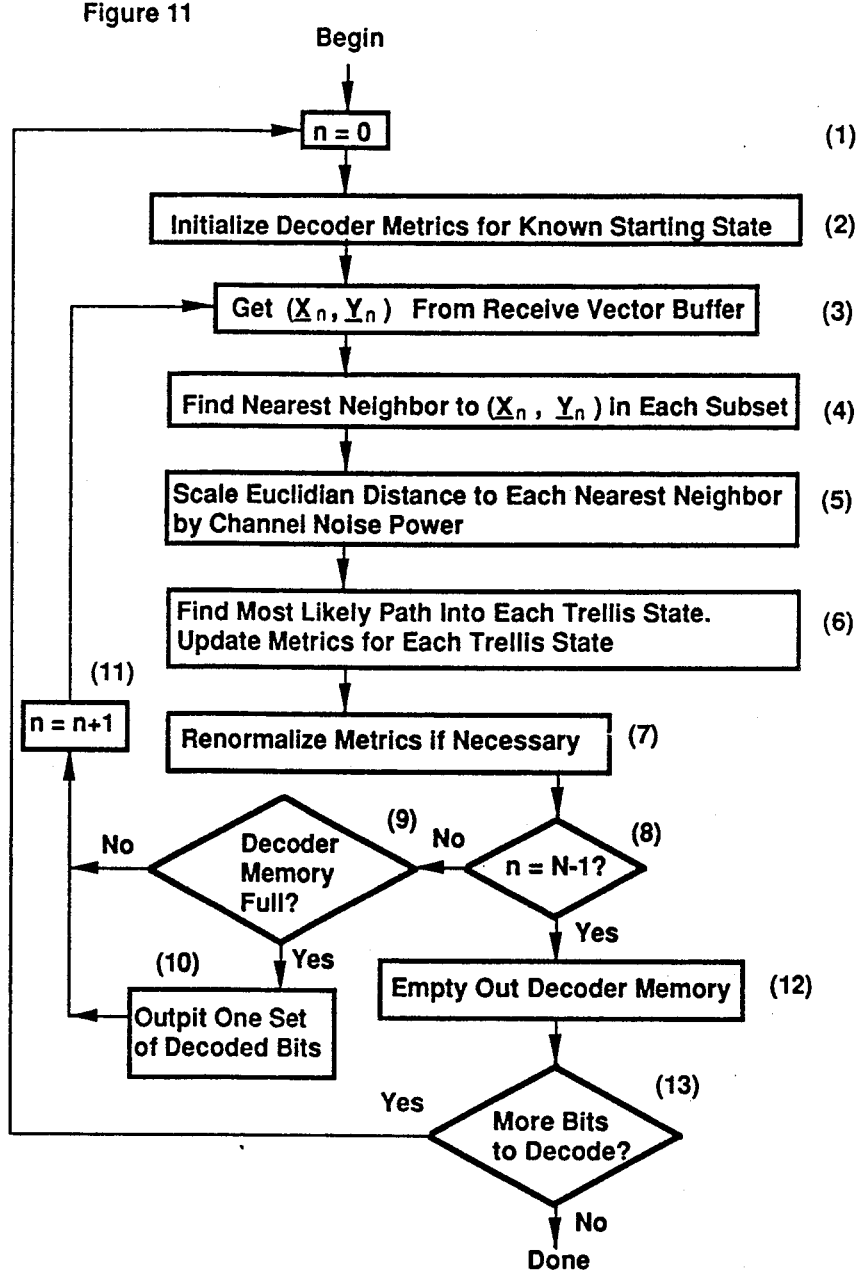
FIG. 11 is a flow chart illustrating the multi-channel trellis decoding process of the present invention.

The flowchart of FIG. 11 details the steps involved in multi-channel trellis decoding. However, before this flowchart is reviewed, several trellis decoding concepts are discussed. The following discussion applies to both single-channel and multi-channel trellis decoding.

The decoder uses the fact that the entire set of points in a given constellation is partitioned into subsets. A subset is defined as follows. In a generalized trellis encoder, the convolutional encoder 76 of FIG. 4 is actually an arbitrary rate convolutional encoder. The output bits of the finite state encoder 71 define a point in a constellation, while the output bits 80 of the convolutional encoder 76 determine in which subset the point belongs. Assuming that the particular embodiment of the finite state encoder of FIG. 6 is used in conjunction with the particular embodiments of the constellations shown in FIGS. 5A-5F, the following examples further describe subsets. Referring to FIG. 6, since the convolutional encoder has 3 output bits 97, the $2^{m+1}$ outputs of this finite state encoder 95 are partitioned into $2^3=8$ subsets, independent of the value of m. For example, suppose that m=3, and the output of the finite-state encoder is $x_3,z_2,z_1,z_0=1000$. Then this point belongs to subset 0. Furthermore, there are two points in the 16 point constellation that belong to subset 0: 1000 (10 octal) and 0000 (00 octal). These points are circled in the 16 point constellation shown in FIG. 5B. Referring to FIGS. 5A, 5B, 5C, 5D, 5E, 5F, each of the constellations can be partitioned into 8 subsets, where the number of points belonging to each subset is 1, 2, 4, 8, 16, 32 respectively. The members of subset 0 are circled in each of the constellations.

Figure 15:
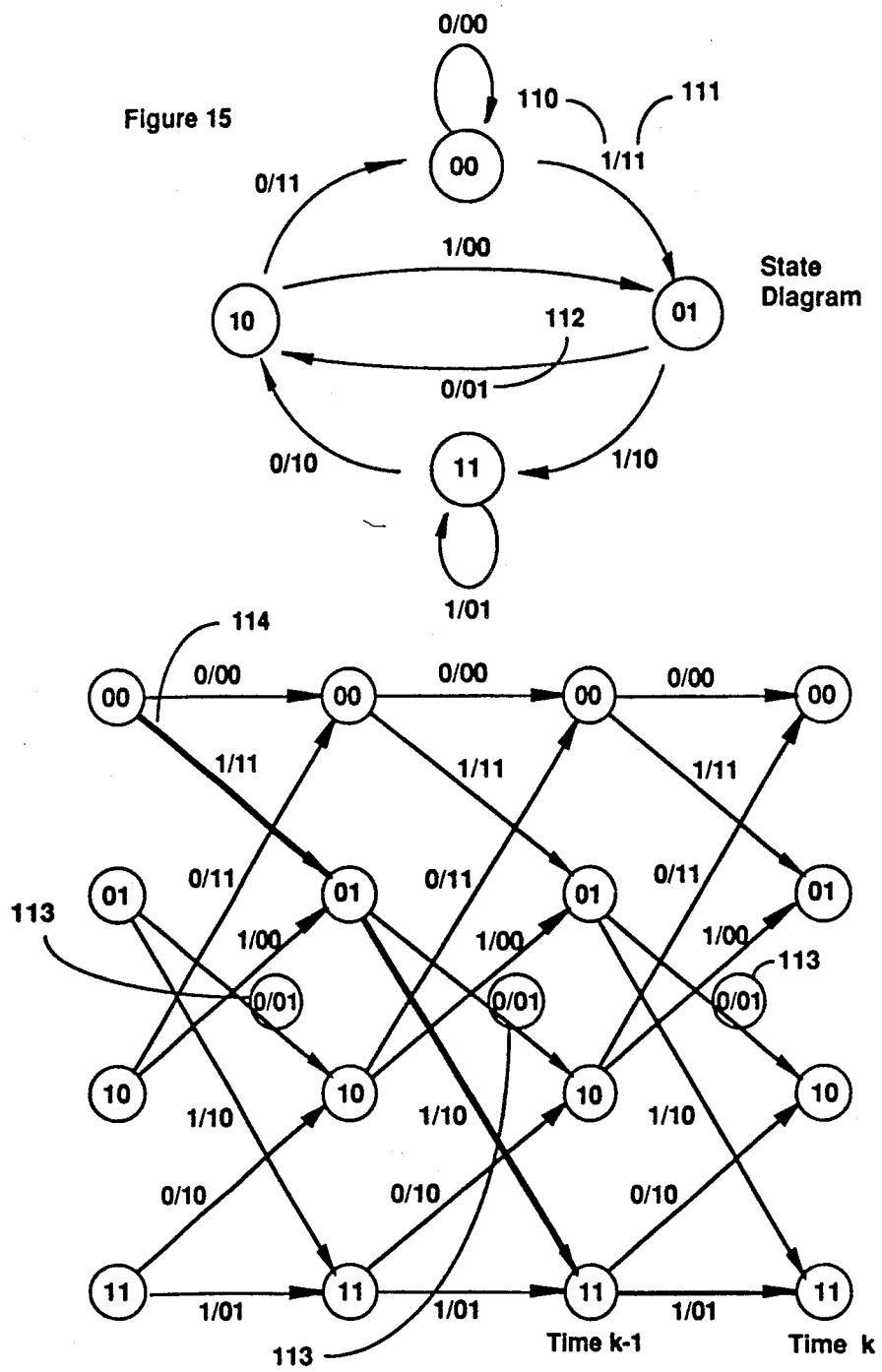
FIG. 15 illustrates a trellis diagram representation of a state diagram.

As is well known in prior art, any convolutional encoder can be described using either a state diagram or a trellis diagram. A trellis diagram is equivalent to a state diagram. In a trellis diagram, each state is repeated for each set of input bits. FIG. 15 illustrates the difference between a state diagram and a trellis diagam for a rate ½ (1 bit in, 2 bits out) encoder with 4 states. The branches in both diagrams are labeled with the input bit 110 which causes the state transition and the output bits 111 which result from the transition. For example, transition 112 occurs when the encoder state is 01, and the encoder input is 0. The resulting output bits are 01 and the new state is 10. The same transition is shown in 113 of the trellis diagram.

Figure 12:
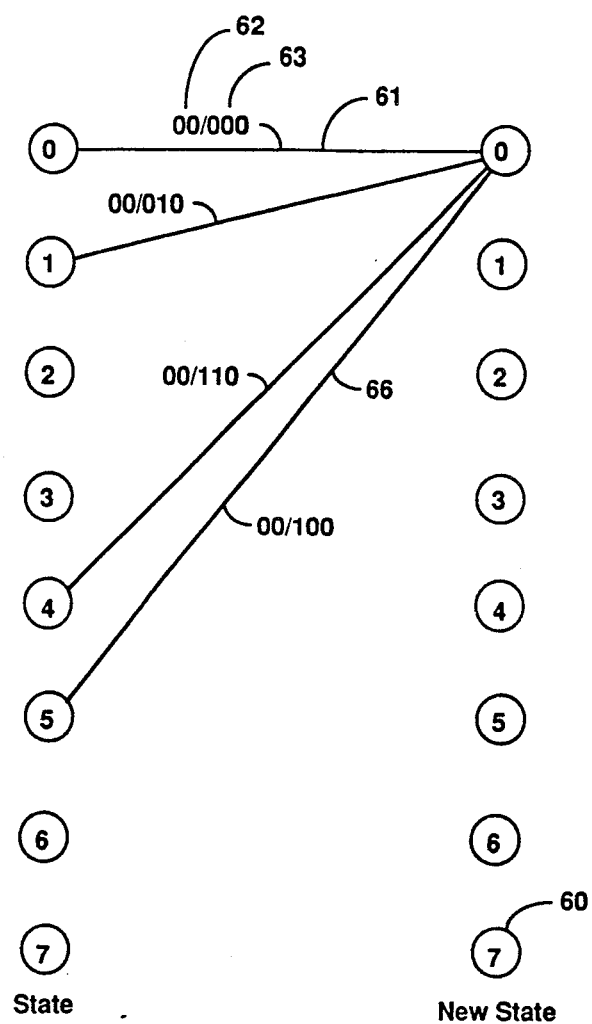
FIG. 12 is a partial trellis diagram of the rate ⅔, 8 state (constraint length 3) convolutional encoder shown in FIG. 6.

Referring to a specific embodiment of this invention, a state diagram could be drawn for the convolutional encoder 93 of FIG. 6 using the truth table of FIG. 7. A partial trellis diagram for his encoder is shown in FIG. 12. Referring to FIG. 12, the nodes of the trellis depict the 8 convolutional encoder states 60. The lines connecting the nodes indicate valid state transitions 61. Each possible state transition is labeled with the 2 input bits 62 which would cause the transition, and also the output bits 63 which would result from the transition. All of the transitions of FIG. 7 which result in a new state of 0 64 are mapped onto the trellis diagram of FIG. 12. For instance, in 65 of FIG. 7 and 66 of FIG. 12, when the encoder is in state 5 (101), and bits $x_2x_1=00$ are input to the encoder, then the output bits are $z_2z_1z_0=100$ and the new state is 0 (000). To complete the trellis diagram, the four transitions into each of the new states 1-7 must be included.

Referring to the flowchart of FIG. 11, the operation of the multi-channel trellis decoder will now be described. Multi-channel trellis decoding consists of 2 basic steps: Finding the squared Euclidean distance of the received point $(X_n,Y_n)$ to the nearest neighbor in each subset (step 3), and then performing maximum likelihood sequence estimation using the Viterbi algorithm (steps 4-13). Maximum likelihood sequence estimation using the Viterbi algorithm is described in several books and articles, including:

Clark, G. C. and Cain, J. B., "Error-Correction Coding for Digital Communications", Plenum Press, New York and London, 1981, pp. 227-266.

Lin, S. and Costello, D. J., "Error Controd Coding: Fundamentals and Applications", Prentice-Hall, Inc., Englewood Cliffs, N.J., 1983, pp. 287-349.

Bartee, T. C. editor, "Data Comm, Networks and Systems", Howard W. Sams and Co., Inc. a publishing subsidiary of ITT, 1985, pp. 289-354.

The application of Viterbi decoding to trellis coded modulation is described in the following references. When Viterbi decoding is used in trellis decoding, squared Euclidean distance is used instead of Hamming distance when comparing the received data to data which could have been received.

Ungerboeck, Gottfried, "Trellis-Coded Modulation with Redundant Signal Sets", IEEE Communications Magazine, Vol. 25, No. 10, February 1987, pp. 5-21.

Underboeck, Gottfried, "Channel Coding with Multilevel/Phase Signals", IEEE Transactions of Information Theory", Vol. IT-28, No. 1, January 1982, pp. 55-66.

The difference between multi-channel trellis decoding and single-channel trellis decoding lies in step 5. This step must be performed by the multi-channel trellis decoder when the noise power varies from carrier to carrier.

The steps of FIG. 11 are described assuming the encoder of FIG. 6 and the constellations of FIGS. 5A-5F. The flow chart also assumes that code tailing over the N carriers is implemented, that is, that the two least significant bits which were transmitted on channels $f_{N-2}$ and $f_{N-1}$ were 00. One skilled in the art can easily adapt the multi-channel trellis decoder to decode a sequence encoded by an encoder with different parameters, or to decode a sequence for which code tailing was not employed.

Referring to FIG. 11,

In step 1, n is set to 0, so that the vector which resulted from the demodulation of carrier $f_0$ is the first vector which is input into the decoder.

In step 2, the decoder metrics are initialized to account for the fact that the true path through the encoder trellis will begin in state 0 (or any other selected known state). The decoder metric is defined and used just as in the prior art of maximum likelihood, often called Viterbi, decoding. The state with the lowest metric at time k is the most probable state at time k. Let m(x) be the decoder metric for state x. Then in this step 2, the following is performed:

$m(0)=0$, $m(1)=m(2)=m(3)=m(4)=(5)=m(6)=m(7)=M$, where M is the largest possible positive integer supported in the implementation.

In step 3, the vector $(X_n, Y_n)$ which resulted from the demodulation of carrier $f_n$ is read from the receive vector buffer (54 of FIG. 9)

In step 4, the nearest neighbor (in terms of squared Euclidean distance) to $(X_n, Y_n)$ in each subset of the $m_n$ bit/carrier constellation is computed. Note that $m_n$ may be different each time this step is executed. Squared Euclidean distance between $(X_n, Y_n)$ and a constellation point $(X_p, Y_p)$ in a subset is given by the equation $(X_n - X_p)^2 + (Y_n - Y_p)^2$. The results of this step are thus:

d(s) = Euclidean distance to nearest neighbor in subset s, and, p(s) = $m_n$ − 3 most significant bits of label of nearest neighbor in subset s.

In step 5, the distances computed in step 4 are scaled by the channel noise power, as: d(s) = d(s)/(channel noise power).

In step 6, the most likely path into each state is found. For example, for state 0, the most likely path is the path that results in the lowest metric at time k for state 0. The new metric for state 0 is given by:

$m_k(0)$ = min of the following values $m_{k-1}(0) + d(0)$ $m_{k-1}(1) + d(2)$ $m_{k-1}(4) + d(6)$ $m_{k-1}(5) + d(4)$ where $m_{k-1}(0)$ is the metric for state 0 at time k−1.

In step 7, a constant is subtracted from each decoder metric to prevent decoder overflow. This step only needs to be performed when the metrics have grown large.

In step 8, if the vector which is being processed is not from the last carrier, numbered N−1, then step 9 is performed.

In step 9, if the decoder memory is full, then step 10 is performed. Decoder memory is defined and used just as in the prior art of maximum likelihood or Viterbi decoding. The decoder memory is just a circular buffer in length equal to the path length of the decoder. The path length of the decoder is typically 4–5 times the encoder constraint length, which would mean 12–15 in length in the embodiment assumed here.

In step 10, the trellis state with the smallest metric is selected. A backward trace through the trellis is then performed, where in each stage of the trace, a backward step in the trellis is taken to the most likely previous state. When the end of the decoder memory circular buffer is reached the bits corresponding to that position are output.

Step 11 increments the carrier number being processed and is taken from both step 9 and step 10.

Step 12 is taken if the vector from the last carrier was just processed. In this case the decoder memory is emptied.

Step 13 determines if further symbols are available to be decoded.

HARDWARE IMPLEMENTATION

Figure 13:
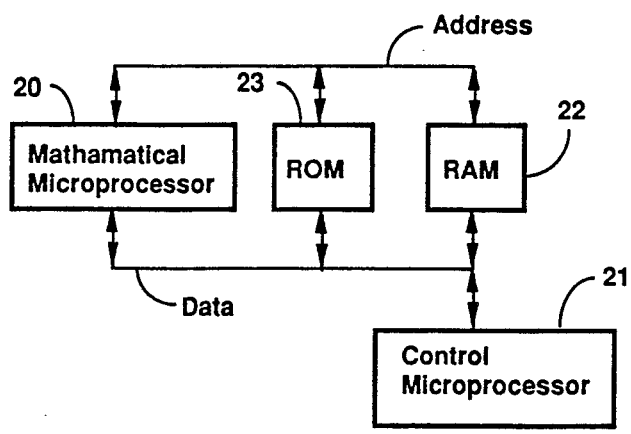
FIG. 13 is a schematic diagram of a hardware embodiment of the present invention.

FIG. 13 is a block diagram of a hardware embodiment of the invention. The multi-channel trellis encoder 44 and the multi-channel trellis decoder 55 shown in FIG. 9 are implemented with the mathematical microprocessor 20 shown in FIG. 13. The control and scheduling unit 58 shown in FIG. 9 is implemented with the control microprocessor 21 shown in FIG. 13. The input buffer memory 43, the transmit vector buffer memory 45, the receive vector buffer memory 54, and the output buffer memory 56 shown in FIG. 9 are implemented with the RAM 22 shown in FIG. 13. The ROM 23 includes both program memory and look-up tales for performing the multi-channel trellis encoding and the multi-channel trellis decoding.

For the sake of clarity and ease of description, this invention has been illustrated and explained with respect to a specific embodiment. However, the scope of the present invention is intended to be measured by the claims as set forth hereafter. It is clear that those skilled in the art to which the present invention applies will be able to practice the present invention with variations in structure from the preferred embodiment.

In particular, the constellations used need not be limited to those pictured in FIG. 5A-5F. THe constellations illustrate specific amplitude and phase modulation schemes. However, a phase modulation only, an amplitude modulation only, or an arbitrarily shaped phase and/or amplitude modulation constellation may be employed by the multi-channel trellis encoder/decoder. Also, the number of bits/carrier need not be limited to 2-7 bits/carrier as depicted in FIG. 5A-5F.

Still further, the convolutional encoder need not be limited, as shown in FIG. 6 and FIG. 7, to a rate ⅔ constraint length 3 encoder. Optimal encoder structures for various types of constellations, numbers of states, and rates are given in an article by Gottfried Ungerboeck entitled "Trellis-Coded Modulation with Redundant Signal Sets", IEEE Communications Magazine, Vol. 25, No. 10, issued February 1987, pg. 20.

Still further, the information units utilized in the above description were bits. However, the invention is not limited to a binary system.

What is claimed is:

1. A method for encoding data for delivery over a multi-channel data delivery system and for decoding the received encoded data after delivery, said method comprising the steps of:
    a. receiving the data bits to be encoded onto each of the channels of the multi-channel data delivery system; p1 b. trellis encoding portions of the data of step a. sequentially from channel to channel of the multi-channel data delivery system;
    c. simultaneously applying the trellis encoded data of step b. to each of the channels of the multi-channel data delivery system;
    d. receiving the trellis encoded data from each channel of the multi-channel data delivery system;
    e. sequentially decoding the data of step d.; and
    f. delivering the decoded data of step e. to an external device.

2. Apparatus for encoding data for delivery over a multi-channel data delivery system and for decoding the received encoded data after delivery comprising:
    means for receiving the unencoded data to be encoded onto each of the channels of the multi-channel data delivery system;
    means connected to the receiving means for trellis encoding portions of the received unencoded data sequentially from channel to channel of the multi-channel data delivery system;

means responsive to the encoding means for simultaneously applying the trellis encoded data to each of the channels of the multi-channel data delivery system;

means coupled to the multi-channel data delivery system for receiving the trellis encoded data from each channel of the multi-channel data delivery system;

means for sequentially decoding delivered data from the channels of the multi-channel data delivery system; and means responsive to the decoding means for delivering the decoded data to an external device.

3. A method for decoding trellis encoded data from a multi-channel data transmission system, the method comprising the steps of:
 a. receiving the encoded data from said multi-channel data transmission system; and
 b. trellis decoding, sequentially, portions of the data of step a. while adjusting the nearest neighbor squared distance for each chennel by the signal to noise performance of that channel.

4. A method as in claim 3 wherein step b. includes decoding of a complete received multi-channel data symbol based on the knowledge of the encoder state for the last channel of the multi-channel system.

5. Apparatus for decoding trellis encoded data from a multi-channel data transmission system comprising;
 means for receiving the encoded data from said multi-channel data transmission system; and
 means for trellis decoding, sequentially, the data received by the receiving means while adjusting the nearest neighbor squared distance for each channel by the signal to noise performance of that channel.

6. Apparatus as in claim 5 wherein the decoding means includes decoding of a complete received multi-channel data symbol based on the knowledge of the encoder state for the last channel of the multi-channel system.

7. In a modem for transmitting data over a multi-channel data transmission path, a method for encoding received unencoded data and for decoding received encoded data comprises the steps of:
 a. receiving unencoded data bits to be encoded onto each of the channels of the multi-channel data delivery system from an external source;
 b. trellis encoding portions of the data of step a. sequentially from channel to channel of the multi-channel data delivery system;
 c. simultaneously applying the trellis encoded portions of the data of step b. to a corresponding one of the channels of the multi-channel data delivery system;
 d. receiving encoded data signals from each of the channels of the data transmission system;
 e. sequentially decoding the encoded data of step d.;
 f. presenting the decoded data for delivery to an external device.

8. A modem for transmitting data over a multi-channel data transmission path wherein the received data from an external source is encoded for transmission and received transmitted encoded data is decoded comprises:
 means for receiving unencoded data bits to be encoded onto each of the channels of the multi-channel data delivery system from an external source;
 means for receiving encoded data signals from each of the channels of the data transmission system;
 means for trellis encoding portions of the data received from an external source sequentially from channel to channel of the multi-channel data delivery system, and for seuqentially decoding the encoded data received from the transmission system;
 means for simultaneously applying the trellis encoded portions of the data received from the external source to a corresponding one of the channels of the multi-channel data delivery system; and
 means for presenting the decoded data for delivery to an external device.

9. A method of trellis encoding each of N carriers of a multi-carrier channel where N is an integer having a value of at least 2, said method comprising the steps of:
 a. receiving a set of data bits to be encoded onto said N carriers;
 b. dividing said set of data bits of step a. into N packets of $M_n$ bits each where $M_n$ is an integer number of bits to be encoded onto carrier n of said N carriers to be transmitted in a selected period of time, $T_{sym}$;
 c. convolutionally encoding, sequentially, each packet of $M_n$ bits of step b. into $M_n+R$ bits, where R is a positive integer, using K of the least significant bits of the $M_n$ bits within packet n, where K is an integer having a value of at least 2, in (1/N) the time period $T_{sym}$;
 d. mapping each set of $M_n+R$ bits of step c. into a trellis encoder constellation for $M_n$ bits encoded into $M_n+R$ bits each within (1/N) of the time period $T_{sym}$;
 e. determining the $X_n$ and $Y_n$ coordinates of each of the mapped sets of bits from step d. each within (1/N) of the time period $T_{sym}$; and
 f. modulating the cosine and sine components of the carrier frequency of each of the N carriers using the $X_n$ and $Y_n$ coordinates from step e. for the appropriate carrier to form a multi-carrier signal of $T_{sym}$ duration on a single channel.

10. A method as in claim 9 wherein steps b. through f. are all performed within the same $T_{sym}$ period of time.

11. A method as in claim 9 wherein the values of $M_n$ can each be of a value different from each other.

* * * * *